United States Patent [19]
Jones

[11] 3,846,795
[45] Nov. 5, 1974

[54] EARLY WARNING MATERIAL FAILURE INDICATOR

[75] Inventor: Cecil Roy Jones, Orange, Conn.

[73] Assignee: Transfer Systems Incorporated, North Haven, Conn.

[22] Filed: Nov. 3, 1972

[21] Appl. No.: 303,549

[52] U.S. Cl. ............... 340/421, 324/71 E, 310/15, 204/195 C, 23/253 C, 73/86
[51] Int. Cl. .......................................... G08b 21/00
[58] Field of Search ........ 176/19, 88; 340/421, 272, 340/235; 204/195 C; 23/230 C, 253 C; 200/61.08; 325/116; 73/86; 324/65 CR, 71; 310/15

[56] References Cited
UNITED STATES PATENTS

| | | | |
|---|---|---|---|
| 2,762,036 | 9/1956 | Timan | 340/267 |
| 2,956,225 | 10/1960 | Marsh et al. | 324/71 |
| 3,047,847 | 7/1962 | Marsh et al. | 340/235 |
| 3,621,810 | 11/1971 | Zuck | 116/114.5 |

*Primary Examiner*—John W. Caldwell
*Assistant Examiner*—William M. Wannisky

[57] ABSTRACT

Apparatus for providing an early warning of impending failure of a system structural element subject to corrosion. The apparatus provides a housing containing a corrodible member and coupled to the structure so as to expose the corrodible member to the same corrosive environment as in the system. The corrodible member is constructed and stressed so as to fail before the structural element. Failure of the corrodible member gives an indication that failure of the structural element is approaching, allowing shut-down of the system and repair or replacement of failing structural elements.

13 Claims, 4 Drawing Figures

EARLY WARNING MATERIAL FAILURE INDICATOR

This invention relates to an early warning indicator of material failure, and in particular to apparatus adapted for connection on-line to a system exposed to a corrosive environment for the purpose of indicating impending failure of a system structural element prior to its actual failure. A most important application for the invention is in the nuclear reactor field.

One form of nuclear power station employs in its primary cooling system a recirculation loop for liquid coolant under high pressure. To resist corrosion by the coolant, the loop piping is usually constructed of stainless steel. This in turn is connected to carbon steel of the reactor pressure vessel, which is generally accomplished by welding via a transition piece which is welded to both the stainless steel and carbon steel. A problem exists in the ability of the transition piece to withstand corrosion. In some instances, failure has unexpectedly occurred, disrupting the reactor primary cooling system. As will be appreciated, such instances are to be avoided at all costs because of the potential catastrophic results from an uncontrolled nuclear reactor. Many of these installations also employ piping for carrying cooling water for a steam condenser. The likelihood of corrosion and failure of such piping material is accelerated in those installations where sea water (with a high salt content) is employed as the secondary coolant. One solution for avoiding unexpected failure of such structural elements subject to corrosion is periodically to shut down the reactor station for careful inspection of failure-prone structural elements of the system. This approach is costly due to the revenue lost while the station is shut-down and due to the considerable manpower required to carry out a thorough inspection. Moreover, one of the more common modes of material failure, called stress-corrosion cracking, is characterized by tiny growing surface and sub-surface cracks which are hardly visible to the naked eye in a surface exhibiting none of the other tell-tale signs of corrosion, such as pitting. Moreover, this failure mode, once initiated, can bring about total failure in a remarkably short time.

My invention solves the above-mentioned problem by affording continued on-line surveillance or monitoring of materials of structural elements exposed to a corrosive atmosphere. In particular, my invention provides apparatus for coupling to the system component whose material state is to be monitored and is constructed to provide an early warning or indication that failure of a corrodible system component is impending to enable system shut-down prior to actual failure and allow careful inspection of the system and replacement or repair of the system components likely to fail. In accordance with my invention, the apparatus comprises means for coupling to the system such that at least a part of the apparatus interior becomes subject to the same corrosive environment to which the system is subjected. Mounted within that part of the apparatus interior is a corrodible member having the characteristic that it is more prone to failure than any system element, with the result that the corrodible member will always fail before any system component fails. Means are provided coupled to the corrodible member for indicating failure of the corrodible member, thus providing an early warning of impending failure of the system. The corrodible member is located and arranged in such a manner that its failure has no detrimental influence on the system.

My apparatus is especially suited for providing an early warning of failure of a system structural element by stress-corrosion cracking, which is extremely important because of the rapid and insidious nature of this failure mode. For this purpose, I provide in my apparatus a corrodible member more prone to failure by stress-corrosion cracking than the system elements. In a first preferred embodiment, the corrodible member is a specimen identical to the materials actually used to construct the system and most likely to fail. The corrodible member is modified to concentrate an applied stress, and subjected to a unit stress at least equal to, and preferably higher than, that to which the system element is subjected during use. The result is to make the test specimen fail well in advance of failure of the system element. In a second preferred embodiment, the corrodible member may still have the same composition as that of the system element but is fabricated by a process which will cause accelerated failure when stressed and exposed to the corrosive environment.

Indicator means are coupled to the corrodible member and are responsive to failure thereof to provide an observable indication of failure thereof. In a preferred embodiment, the corrodible member or an element supported thereby is movable from a first non-failed position to a second failed position upon failure of the corrodible member. Coupled to the corrodible member and movable therewith is a magnetic member. Electromagnetic means responsive to movement of the magnetic member is magnetically coupled to the magnetic member so as to provide an electrical signal available at a remote location upon movement of the magnetic member to the second failed position and thus an indication of failure of the corrodible member. Preferably, the electromagnet means comprise a linear voltage differential transformer (LVDT), a known instrument, which is very sensitive to detecting small movement of a magnetic member.

My invention will now be described in greater detail with respect, by way of example, to several exemplary embodiments thereof when taken in conjunction with the accompanying drawings, wherein.

Power nuclear reactor stations of the popular BWR or PWR type usually provide a primary cooling system in which a suitable coolant is pumped at high pressure through a recirculating loop. The piping for this loop is generally constituted of a high strength corrosion-resistant material, such as stainless steel type No. 304. Typically, a light water primary coolant for a BWR is maintained at about 1,000 psi, and for a PWR is maintained at about 2,500 psi. While the water may be initially purified, during use it accumulates various corrosives, such as reactive halogens and halides which are radioactive products which leak from the reactor fuel elements. In condenser cooling system, sea water with a high salt content, such as $MgCl_2$ or $NaCl$ is sometimes employed. In either case, there is the possibility of unexpected failure of the piping and loss of the coolant. As will be appreciated, such unexpected failures can have potential catastrophic results.

Figure 1:
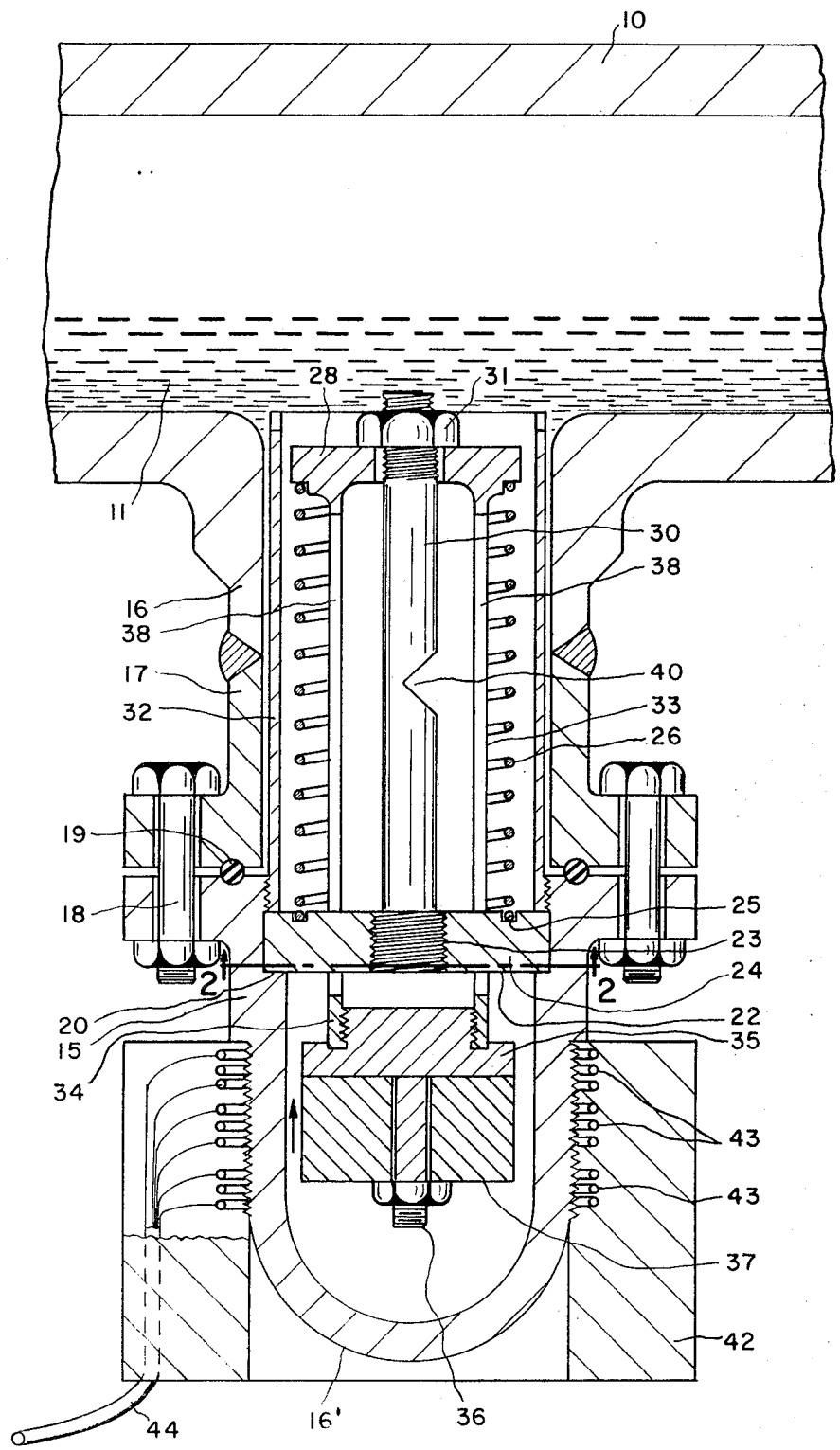
FIG. 1 is a partly cross-sectional, partly elevational view of one form of apparatus in accordance with my invention shown coupled to a system subject to corrosion.

FIG. 1 illustrates part of the piping of a coolant system for a nuclear reactor. The piping includes a cylindrical pipe section 10 which confines and transports a coolant fluid 11 under pressure. The fluid 11 constitutes a corrosive environment for the piping material especially when the piping is loaded by a high fluid pressure. This combination of a corrosive medium and a highly stressed material create the conditions which can bring about failure by cracking of the material even when the applied stress is well below the yield point of the material. Structural parts which have a high residual stress (due to high temperature processing such as welding) can fail under surprisingly low external loading.

In my invention, I provide apparatus coupled to the system to provide an early warning of failure of the piping. In one form of my invention, the apparatus includes a housing 15 of cylindrical configuration with a dome bottom 16'. The housing can be coupled to piping 10 by various ways. One convenient way is illustrated. To an access port or nipple 16 located at the bottom side of the piping is welded a flanged fixture 17. The housing 15 is bolted 18 to the fixture 17 in a liquid tight manner, for example, with an O-ring seal 19.

The upper portion of the housing wall 15 has an annular shoulder 20 on which is seated a lower specimen support 22 comprising a threaded hub 23 from which extend radial arms 24. On the upper surface of the lower specimen support is an annular groove 25 for receiving a compression spring 26 which extends upwardly and is secured to a circular upper specimen support 28.

Secured between the upper and lower specimen supports 22, 28 is the test specimen itself, the aforementioned corrodible member, in the form of a rod 30 threaded at opposite ends. The lower thread end engages the threaded hub on the lower support. The upper threaded end clears an opening in the upper support 28 and is firmly secured thereto by means of a nut 31. The lower specimen support is fixed to the housing 15 by means of a locking retainer 32, screwed at its bottom to the housing, and extending upward to form a protective cylindrical liner surrounding the spring 26. Extending downward from the upper specimen support 28 and inside the spring is a hollow cylindrical member 33 which terminates in a threaded ring 34 located below the lower specimen support 22. In threaded engagement with the latter is a support piece 35 with a depending bolt 36 by which a magnetic member 37, for example of soft iron, is secured as shown. The extension 33 of the upper support is provided with opposed elongated slots 38 through which extend the radial arms 24 of the lower support thus enabling the upper specimen support 28 to move in a vertical direction relative to the bottom support 22.

As will be observed, the biasing action of the spring 26 is such as to put a strong tension loading on the specimen 30 which in the absence of the specimen 30 would cause the upper support 28 to move upwardly a short distance until the lower support arms 24 strike the ring 34. This upward movement is resisted by the test specimen 30. As will further be observed, the test specimen is exposed to the same corrosive environment represented by the coolant 11 via the slots 38 in the extension 33. It is loaded by the spring 26 to a unit stress preferably higher than that which the piping will see. The material of the test specimen is preferably an actual piece of the piping itself, ie, has the identical composition. To further ensure failure of the test specimen prior to the piping, a sharp notch 40 is machined as shown in the specimen. This accelerates failure in the specimen for two reasons. First, the stresses are concentrated due to the reduced cross-section. Second, sharp edges represent more likely sites for the growth of stress-corrosion cracks. When the specimen 30 cracks and fails, the spring 26 drives upper support 28 upward, carrying with it the magnetic member 37. In accordance with the invention, movement of the magnetic member is sensed. This can be accomplished by any known manner. I prefer however to use a linear voltage differential transformer (LVDT) for this purpose, an instrument whose principles are known in the art. The instrument comprises a sensing unit 42 which surrounds the housing 15 and which comprises an annular assembly in which are embedded a plurality, three in the example illustrated, of windings 43. The windings 43 are aligned relative to the magnetic member 37 such that when suitable currents are passed therethrough, the relative magnetic couplings between the windings will cause the generation of a particular signal voltage from the unit, which can be transmitted to a remote location by way of simple cabling 44, for example to the reactor control room. Should the magnetic member 37 move and change its position relative to the windings, then the relative magnetic couplings between the windings changes and a different signal is generated. Thus failure of the specimen 30 and movement of the magnetic member 37 from the non-failed position illustrated upward to a failed position will be indicated by a change in the signal generated by the LVDT sensor. As shown, the sensor 42 can be permanently mounted on the housing 15, for example, by a threaded connection between the sensor housing 42 and the outer housing wall. Since the windings are required to be magnetically coupled to the movable magnetic member, the housing 15 separates them must be of non-magnetic material, such as 304 ss.

Figure 3:
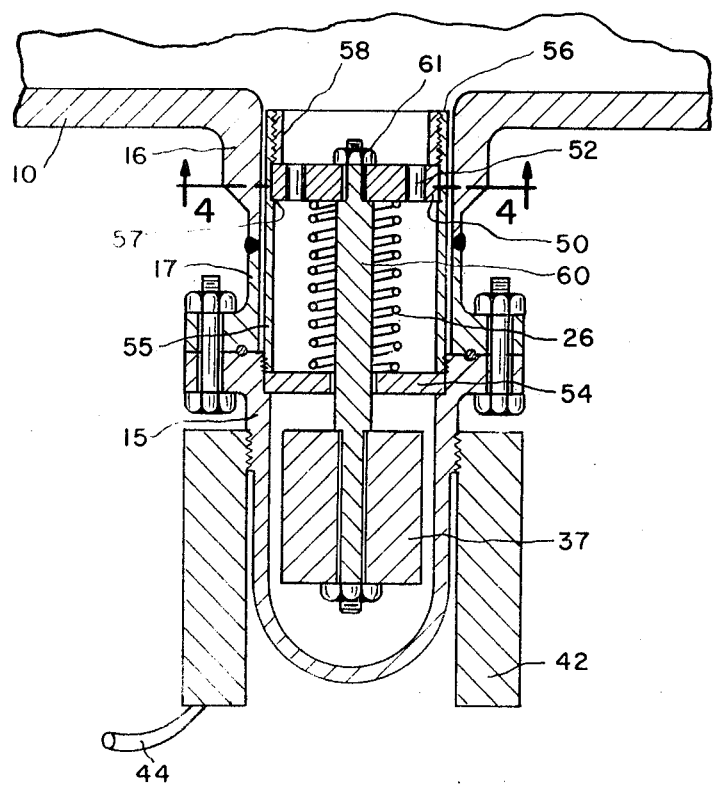
FIG. 3 is a partly cross-sectional, partly elevational view of another form of apparatus according to my invention shown coupled to a system subject to corrosion.

FIG. 3 shows a modification. Similar parts bear the same reference numerals as that of the FIG. 1 embodiment. The major difference is the form and mounting of the corrodible member or test specimen. The test specimen in FIG. 3, designated 50, comprises a circular plate-like member having a center hole 51 and a series of annularly-arranged holes 52 forming ligaments 53 of reduced cross-section extending between the holes. A lower support 54 is mounted on the housing 15 and secured in place by a threaded insert 55 forming an upward-extending liner having an internal threaded section 56 located above a shoulder 57 on which is seated the test specimen 50. The latter is held in place by a second threaded locking insert 58. A tie rod 60 is secured to the specimen 50 by a nut 61, and extends downward passing through an opening in the lower support and to the bottom end of which is secured the magnetic member 37, for example of soft iron. A compression spring 26 extending between the specimen 50 and lower support 54 applies a loading tensile stress on the specimen 50. In this embodiment, the specimen 50 may be of the same composition as the piping 10, but is fabricated by a different technique to render it more susceptible to failure. A preferred method is by powder metallurgy, such that the density of the specimen is lower than that of the piping material. The reduced density increases the exposure of the grain boundaries to the corrodents and accelerates failure. This can be further enhanced by providing connected pores throughout the specimen to enable interior grain boundaries to be attacked. The susceptibility to failure is also enhanced by the presence of the holes 52 producing reduced cross-sectioned ligaments where the applied stresses become concentrated. As in the other embodiment, the specimen 50 is exposed to the same corrosive environment as the piping itself.

Known powder metallurgical techniques may be employed to construct the test specimen 50 to ensure failure before the piping elements when constructed of type 304 stainless steel. As one example, the specimen 50 may be formed of sintered 304 stainless steel as follows. A mixture of −325-mesh electrolytic iron, nickel, and chromium powders is compacted at 70 tsi and sintered at 2,370°F for 44 hours in dry hydrogen. The time of failure can be controlled by varying the process conditions to provide specimens ranging between 40 percent and 99.9 percent of theoretical density, obtained by sintering powders having a mean size ranging from 1 to 1000 microns at temperatures between 1,200° to 2,500°F for times of 1–24 hours. As indicated previously, the more porous the material, the shorter the time for failure to take place.

The specimen parameters, size, and applied stress are readily controlled to achieve the objective of failure of the specimen before failure of any piping materials. When the corrodible member 50 fails, which will occur along the ligaments 53, the tie rod 60 is driven upward, carrying with it the magnetic member whose changed position will be sensed by the LVDT.

The preferred examples have been described in connection with their application to nuclear power stations, but it will be understood that the invention is not limited thereto but has application to any system wherein a structural element or part of the system is exposed to a corrosive environment which can bring about failure of the element in an unpredictable manner, and a need exists for being able to anticipate failure of the structural element before its actual occurrence to lessen the effects of such failure. For instance, there are many systems in use in the chemical industry wherein corrosive fluids or gasses are transported or contained under pressure and wherein it would be most useful to have an early warning of impending failure before its actual occurrence.

Figure 2:
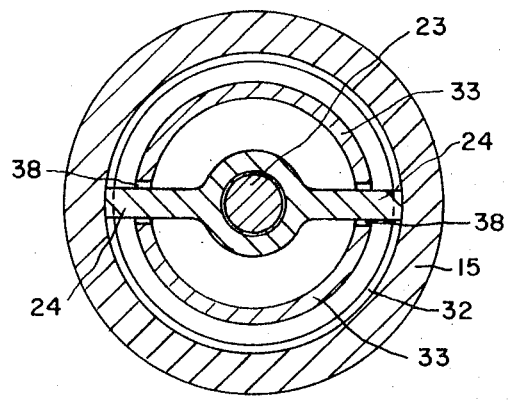
FIG. 2 is a cross-sectional view of the apparatus of FIG. 1 taken along the line 2—2.

In the embodiment described in connection with FIGS. 1 and 2, earlier failure of the corrodible member is accomplished primarily by mechanical means, that is, by the addition of the notch 40 to concentrate the stress in combination with the application to the corrodible member of external loading to induce an applied unit stress exceeding that to which the piping is subjected. It will be understood that both factors need not necessarily be present. That is to say, the corrodible member without the notch if subjected to a higher unit stress will usually fail before the piping. Alternatively, the notched corrodible member when subjected to a lower overall unit stress will usually fail earlier because of the enhanced stress concentration at the notched area which experience has shown greatly accelerates stress-corrosion cracking failure thereat in comparison with a member with a smooth surface.

Figure 4:
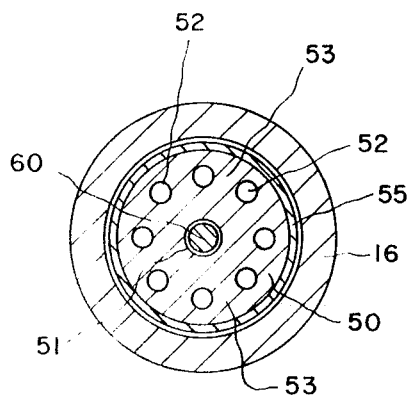
FIG. 4 is a cross-sectional view of the apparatus of FIG. 3 taken along the line 4—4.

In the embodiment described in connection with FIGS. 3 and 4, early failure of the corrodible member is accomplished not only by reducing the cross-section thereof to increase the ligament applied stresses but also by primarily metallurgical factors, that is, by reducing the material density to increase the exposure of its grain boundaries to the corrosive medium and therefore increase the attack thereof to accelerate failure. Variation of other metallurgical parameters in the construction of the corrodible member can also be used to achieve the desired early failure. These parameters include density, grain-size, and the extent of connected versus non-connected pores of the member. Thus, reducing density, reducing grain-size, and increasing the number of surface-connected pores of the material will singly or in combination all reduce the time for failure of the corrodible member when exposed to a corrosive medium. Other material parameters that can be varied to obtain a desired life before failure of the corrodible member include the heat treatment by which the member is fabricated. Thus, employing more severe processing conditions, such as higher temperatures and pressures, creates more internal or residual stresses in the member and renders it less ductile. High internally stressed materials invariably fail earlier than those with a lower level of internal stress. Those skilled in this art will have no difficulty on the basis of the teachings and examples given above to select the appropriate mechanical and metallurgical factors for constructing the corrodible member so as to ensure failure of the corrodible member well before the system elements. Where the corrodible member has the same chemical composition as the system elements, this is readily achieved by mechanical means to increase the applied stress on the corrodible member, or by metallurgical means to increase the internal stress or increase exposure of the grain boundaries to the corrosive medium, in comparison with the system elements, or by both mechanical and metallurgical means. With two specimens of the same material exposed to the same corrosive atmosphere, invariably the specimen under the higher stress will fail earlier. The invention is not limited to the use of the same composition for the corrodible member as that of the system elements. Other compositions can also be employed provided that the corrodible member satisfies the condition of failing before the system elements. For example, if the anticipated lifetime of stainless steel piping for a reactor system is designed initially for 40 years, with a shortened lifetime projected for say 5 years with a contaminant such as chlorine introduced, then on the basis of published data reinforced if desired by a few simple accelerated life tests, it will be readily possible to fabricate a corrodible material of any composition that will fail in say 1 year under the same corrosive conditions. Thus, should the unexpected increase in the corrosive nature of the environment take place, which could bring about earlier failure of the stainless steel piping, then it will usually be found that the corrodible member under the same increased corrosive action will fail in still an earlier time thereby providing the early warning required. Such other compositions include metals such as aluminum, copper and copper-base alloys, and zirconium, all of which are known to be subject to stress-corrosion cracking when exposed to certain common corrosive environments, such as those containing salts or halogens.

In the preferred embodiments, the sensor for the movable member is permanently attached to the indicating apparatus and continuously energized so that there is a continuous electrical monitoring system established providing at some central control, usually remote from the apparatus, a continuous indication of the failed or non-failed condition of the apparatus. While this is preferred, it is not essential to the invention as it also is possible within the broad teachings of my invention to provide a portable sensor which can be applied by hand to each apparatus in succession to ascertain the position of the internal magnetic member. In view of the extreme sensitivity of the LVDT, it is preferred after installation of the apparatus of the invention to apply the sensor and then record the magnitude of the output signal for each apparatus separately while in the non-failed condition, since it would be expected that no two readings will be identical for different apparatus, and the reading taken in the non-failed position for each separate apparatus can then be used as a basis for comparing subsequent readings on the same apparatus as a more positive method of establishing movement of the magnetic member. In the arrangement wherein each apparatus has its own permanent sensor, well known circuit techniques can be applied to null out the signal voltage generated in the non-failed position, so that a signal will appear only when the apparatus is in its failed condition.

In the preferred embodiment, the apparatus is located in a cavity on the underside of the system so as to allow the corrosive medium to enter by gravity the indicator apparatus without obstructing the medium flow. Should a faster flow rate of the medium cause more rapid corrosion, this can be accommodated by raising the corrodible member so that it extends directly in the mainstream of medium flow. Should this undesirably impede the flow rate, then the apparatus can be provided in a separate conduit connected in parallel with the main piping and of a size to ensure a similar flow rate for the medium, or a drain can be connected to the underside of the apparatus with a conventional flow rate control in the drain to establish the desired flow rate through the apparatus.

While my invention has been described in connection with specific embodiments thereof, those skilled in the art will recognize that various modifications are possible within the principles enunciated herein and thus the present invention is not to be limited to the specific embodiments disclosed.

What is claimed is:

1. Apparatus for providing an early warning indication of impending failure of a structural element subjected to a corrosive environment, comprising a corrodible member, means for exposing said corrodible member to the corrosive environment, means for stressing said corrodible member including means for applying to said corrodible member a tensile stress such as to cause movement of the stressing means upon failure of the corrodible member, the amount of stress applied to said corrodible member being such as to cause failure by corrosion of the corrodible member before failure of the structural element, a magnetic member coupled to the corrodible member and adapted to move upon failure of the corrodible member, and means in response to failure of the corrodible member to provide an indication of said failure, said failure responsive means including electromagnetic means magnetically coupled to the magnetic member for detecting movement thereof causing a change in the magnetic coupling.

2. Apparatus as claimed in claim 1 and further comprising a housing, means for mounting the corrodible member within the housing, means for mounting the housing to the structure, and means for attaching the electromagnetic means to the outside of the housing.

3. Apparatus as claimed in claim 2 wherein the electromagnetic means is permanently mounted on the housing, and the electromagnetic means generates an electrical signal upon movement of the magnetic member.

4. In combination, a structural element under load, a corrosive environment to which the structural element becomes exposed and which will ultimately cause failure thereof, and means providing an early warning indication of impending failure of the structural element due to attack by the corrosive environment, said early warning means comprising a corrodible member, means for exposing the corrodible member to the same corrosive environment to which the structural element becomes exposed, means for stressing said corrodible member, said corrodible member when stressed being more prone to failure by stress-corrosion cracking when exposed to said corrosive environment than said structural element, a magnetic member coupled to the corrodible member, means for moving the corrodible member upon failure thereof, and means not exposed to the corrosive environment and magnetically coupled to the magnetic member for detecting movement thereof and generating an electrical signal in response to said movement to provide an early warning of future failure of the structural element.

5. The combination claimed in claim 4 wherein said corrodible member has the same chemical composition as that of the structural element.

6. The combination claimed in claim 4 wherein the corrodible member is more prone to failure by applying to it a greater unit stress than that applied to the structural element by its loading.

7. The combination claimed in claim 6 wherein the greater unit stress is achieved by providing the corrodible member with a region of reduced cross-section.

8. The combination of claim 4 wherein the corrodible member is more prone to failure as a result of having a reduced density compared with that of the structural element.

9. The combination of claim 4 wherein the corrodible member comprises a notched rod, and means for biasing the rod into a tensile stressed condition.

10. The combination of claim 4 wherein the corrodible member comprises a sintered disc having apertures therein, and means for biasing the disc into a tensile stressed condition.

11. In combination, a structural element under load, a corrosive environment to which the structural element becomes exposed and which will untimately cause failure thereof, and means providing at a remote location an early warning indication of impending failure of the structural element due to attack by the corrosive environment, said early warning means comprising a corrodible member, means for exposing the corrodible member to the same corrosive environment to which the structural element becomes exposed, means for stressing said corrodible member, said corrodible member when stressed being more prone to failure when exposed to said corrosive environment than said structural element, and means mechanically spaced from but electrically coupled to said corrodible member and responsive to failure thereof to generate outside the corrosive environment an electrical signal which can be transmitted to the remote location to provide thereat an early warning of future failure of the structural element.

12. The combination claimed in claim 11 wherein said failure responsive means includes a differential transformer capable of detecting small movements of the corrodible member.

13. The combination of claim 11 and further comprising a magnetic member coupled to the corrodible member, means for moving the magnetic member upon failure of the corrodible member, and means including a differential transformer not exposed to the corrosive environment and magnetically coupled to the magnetic member for detecting movement thereof and generating an electrical signal in response to said movement.

* * * * *